Patented Sept. 3, 1929.

1,726,852

UNITED STATES PATENT OFFICE.

EARL H. McLEOD, OF RUTHERFORD, NEW JERSEY, ASSIGNOR TO THE AULT & WIBORG COMPANY OF NEW YORK, OF NEW YORK, N. Y., A CORPORATION OF NEW YORK.

METHOD OF MAKING INORGANIC OXIDES.

No Drawing. Original application filed October 26, 1922, Serial No. 597,181. Divided and this application filed October 26, 1922. Serial No. 597,182.

This invention relates to the production of ferro-ferric oxide pigments from ferric compounds, especially from ferric oxide and from mineral acid ferric salts, and has for its particular objects the economical and expeditious production of such a product in a condition suitable for use in printing inks, paints or like purposes for which such pigments are peculiarly suited.

Heretofore it has been the usual practice to utilize ferrous salts in operations wherein as a final product a ferro ferric oxide was sought. Such salts, however, are not always available at a price which renders the use thereof preferable to ferric salts, especially if ferric oxide in the form of pyrites cinder and hydrochloric acid are both available at relatively cheap prices.

My investigations have led to the discovery that ferric compounds, either in the form of ferric oxide such as iron ore or iron cinders, or else in the form of soluble ferric salts, such for example as ferric sulphate or ferric chloride, are especially suitable for the manufacture of ferro-ferric oxide pigments of high tinctorial strength, of various shades and of extremely uniform character and composition.

In carrying out my invention, I preferably proceed as follows:

Twelve (12) parts of ferric oxide ($Fe_2O_3$), for example iron cinder obtained from pyrites burners are dissolved in fifty (50) parts of 20° Bé. hydrochloric acid. When the ferric oxide is completely dissolved in the foregoing concentrated acid the mixture is diluted with three hundred (300) parts of water. A mixture of twenty-seven (27) parts of soda ash in one hundred (100) parts of water is then slowly added to the foregoing ferric chloride solution while the latter is still cold, in order to effect the precipitation of ferric hydroxide. Following the addition of the sodium carbonate solution, the temperature of the mixture is preferably raised to about 180° F. and the heating is continued until it is evident that the precipitation is complete.

In order to obtain my improved pigment in the desired shade and strength, it now becomes necessary to effect the reversion or "cutting back" of the ferric oxide to an intermediate product consisting of part ferric and part ferrous oxide. This "cutting back" is most expeditiously and economically effected by the direct addition to the foregoing mixture of a solution of nine (9) parts of copperas in forty-two (42) parts of water. The iron sulphate which is added for the purpose of cutting back the mixture effects the precipitation of ferrous oxide and sodium sulphate as a result of the reaction between the excess sodium carbonate contained in the mixture and the ferrous sulphate employed for the cutting back operation.

The foregoing process, it is believed, is represented by the following equations:

$$Fe_2O_3 + 6HCl = 2FeCl_3 + 3H_2O.$$

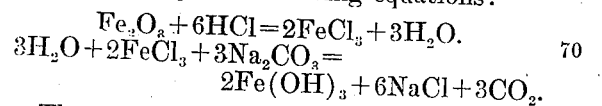

The cutting back operation may be represented by the following equation:

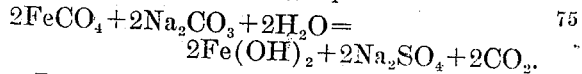

It is evident that the resultant product will consist of an intimate combination of ferric and ferrous oxides and that the shade of the final product, whether yellow, red, brown or black will depend to a great extent upon the ratio of the ferric oxide to the ferrous oxide.

The final product resulting from the cutting back operation is separated by filtration in the usual manner and then dried at a temperature of from 180° F. to 200° F. Obviously the resultant product may contain some iron as hydroxide, the amount depending upon the temperature and time of the drying, but essentially it comprises a ferroferric oxide.

The ferrous oxide formed from the ferrous salt introduced in which I term the cutting back operation becomes homogeneously combined, both physically and chemically, with the entire mass of ferric hydroxide and as a consequence, as hereinafter stated, a product more uniform in strength and color is obtainable than can be accomplished were it attempted to secure such intermediate product by the partial or incomplete oxidation of soluble or insoluble ferrous salts.

Among the several advantages of my process is the fact that, unlike those processes wherein the oxidation of iron hydroxide is carried but partially to completion, the shade of the resultant product can be very accurately predetermined thru the control of the amount of the ferrous salt employed for the cutting back operation and consequently it is possible, as heretofore stated, to turn out successive batches of product each of practically the identical shade and strength. Such accuracy of control is due largely to the fact that in my process the salt operated upon in the final or cutting back operation is a completely oxidized ferric hydroxide and not a partially oxidized iron hydroxide which is susceptible to further oxidation during the subsequent heating and drying stages in the process of treatment. Furthermore, my improved process will produce pigments of almost any desired shade of yellow, red, brown or black which pigments, because of their extreme fineness, uniformity of color and permanency, are especially suited for use in printing inks, paints and like purposes wherein a pigment having such characteristics is adapted.

If desired, milk of lime can be advantageously employed in lieu of part or all of the sodium carbonate for the precipitation of the iron oxide as obviously the amount of calcium sulphate precipitated will be limited by the quantity of ferrous sulphate present.

Unlike other processes of producing ferro-ferric oxides, the operation of my process and the control of the resultant product requires no highly skilled chemist for the purpose of making periodic quantitative analyses of the product as the oxidation progresses, as it is merely necessary for the operator to test with a test paper saturated with potassium ferri-cyanide for unoxidized ferrous salts in order to ascertain whether all ferrous iron has been oxidized. Thereafter, since the quantity of ferrous salt employed in the cutting back operation is predetermined, no quantitative analyses is required in the final stage of the operation, as mere tests with the aforesaid test papers will show when all of the ferrous sulphate added has been converted into ferrous hydroxide.

This application relates to one of the species described in my parent copending application No. 597,181 filed of even date herewith.

Without departing from the spirit of my invention, various modifications of the process herein described, within the scope of the appended claims, may be made.

Having thus described my invention, what I claim and desire to secure by U. S. Letters Patent is:

1. The process of making ferro-ferric oxide, which consists in dissolving a ferric oxide in a strong mineral acid, effecting the precipitation of the iron ions of the resultant salt as ferric hydroxide in intimate combination with precipitated ferrous hydroxide by the addition to said mixture of a ferrous salt.

2. The process of making a ferro-ferric oxide, which consists in dissolving ferric oxide in a hydrochloric acid solution, effecting the precipitation of the iron ions of the resultant salt as ferric hydroxide in intimate combination with precipitated ferrous hydroxide by the addition to said mixture of a ferrous salt.

3. The process of making a ferro-ferric oxide, which consists in dissolving ferric oxide in an acid capable of forming a ferric salt therefrom, effecting the precipitation of an insoluble ferric compound from the resultant solution by the admixture therewith of a ferrous salt while maintaining the mixture sufficiently alkaline to precipitate substantially all of the ferrous salt as an insoluble ferrous compound in intimate combination with such insoluble ferric compound.

4. The process of making a ferro-ferric oxide, which consists in forming a soluble ferric salt from an insoluble ferric compound substantially free from a ferrous compound, and effecting the precipitation of ferric hydroxide from such ferric salt then intimately mixing therewith a ferrous salt and effecting the precipitation in situ in said ferric hydroxide of ferrous hydroxide and then separating such ferro-ferric hydroxide from such solution and substantially converting the same into a ferro-ferric oxide.

Signed at New York city, in the county and State of New York this 24th day of October, 1922.

EARL H. McLEOD.